United States Patent
Kim

(10) Patent No.: US 11,581,519 B2
(45) Date of Patent: Feb. 14, 2023

(54) POST-TREATMENT METHOD OF LITHIUM SECONDARY BATTERY

(71) Applicant: SK INNOVATION CO., LTD., Seoul (KR)

(72) Inventor: Hyun Wook Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 291 days.

(21) Appl. No.: 16/839,772

(22) Filed: Apr. 3, 2020

(65) Prior Publication Data

US 2020/0328400 A1     Oct. 15, 2020

(30) Foreign Application Priority Data

Apr. 10, 2019    (KR) .................. 10-2019-0041683

(51) Int. Cl.
    *H01M 4/04*       (2006.01)
    *H01M 4/525*      (2010.01)
    *H01M 10/0525*   (2010.01)
    *H01M 10/44*      (2006.01)

(52) U.S. Cl.
CPC ......... *H01M 4/0447* (2013.01); *H01M 4/525* (2013.01); *H01M 10/0525* (2013.01); *H01M 10/446* (2013.01)

(58) Field of Classification Search
None
See application file for complete search history.

(56) References Cited

U.S. PATENT DOCUMENTS

| | | | |
|---|---|---|---|
| 9,324,994 | B2 | 4/2016 | Oh et al. |
| 2013/0043843 | A1* | 2/2013 | Amiruddin ......... H01M 4/0447 |
| | | | 429/231.95 |
| 2015/0349327 | A1* | 12/2015 | Hwang ................. H01M 4/133 |
| | | | 429/231 |
| 2017/0018818 | A1* | 1/2017 | Miura ................. H01M 4/5825 |

FOREIGN PATENT DOCUMENTS

| | | | | |
|---|---|---|---|---|
| JP | 2003308880 | A | * 10/2003 | |
| KR | 20070082379 | A | 8/2007 | |
| KR | 20130033060 | A | 4/2013 | |
| KR | 20150049896 | A | 5/2015 | |
| WO | WO-2019107908 | A1 | * 6/2019 | ............ H01M 10/04 |

OTHER PUBLICATIONS www.espacenet.com machine translation of the detailed description of JP 2003-308880A (Year: 2003).*
Hwang et al.; "Investigation of Changes in the Surface Structure of LixNi0.8Co0.15Al0.05O2 Cathode Materials Induced by the Initial Charge"; Chemistry of Materials 26 (2), pp. 1084-1092; published (Jan. 3, 2014) (Year: 2014).*

* cited by examiner

*Primary Examiner* — Gregg Cantelmo
(74) *Attorney, Agent, or Firm* — IP & T Group LLP

(57) ABSTRACT

Provided is a post-treatment method of a lithium secondary battery including: an activation step of charging a heated lithium secondary battery to an activation voltage and maintaining the battery at the voltage, in a state in which the lithium secondary battery including a positive electrode including a nickel-rich (Ni-rich) lithium-transition metal composite oxide having a layered structure containing 0.8 moles or more of Ni based on a total of 1 mole of transition metals as a positive electrode active material; a negative electrode; a separator interposed between the positive electrode and the negative electrode; and an electrolyte solution, which are built in a battery case, is heated, the activation voltage being equal to or higher than a voltage generating phase transition of the lithium-transition metal composite oxide.

5 Claims, No Drawings

POST-TREATMENT METHOD OF LITHIUM SECONDARY BATTERY

CROSS-REFERENCE TO RELATED APPLICATIONS

This application claims priority under 35 U.S.C. § 119 to Korean Patent Application No. 10-2019-0041683, filed on Apr. 10, 2019, in the Korean Intellectual Property Office, the disclosure of which is incorporated herein by reference in its entirety.

TECHNICAL FIELD

The following disclosure relates to a post-treatment method of a lithium secondary battery, and particularly, to a post-treatment method of a lithium secondary battery, which allows the battery to have improved battery stability and life and prevents a decrease in a reversible capacity of the battery, in a lithium secondary battery including a nickel-rich lithium-transition metal compound as a positive electrode active material.

BACKGROUND

A nickel-rich lithium-transition metal compound having a layered structure has a merit of having a high energy density and a competitive price and having reversible discharge capacity increased in proportion to a Ni content.

In particular, since a nickel-rich lithium-transition metal oxide having a nickel content of 80% or more in transition metals may have an average discharge potential of about 3.9 V (vs. Li+/Li) and an average discharge capacity up to about 200 mAh/g, it has received attention as a next-generation high-capacity active material which may achieve a mileage of 500 km or more.

However, the nickel-rich lithium-transition metal compound having a nickel content of 80% or more in transition metals has problems of undergoing phase transition of the crystal structure at a high voltage of 4.15 V and generating gas by an oxidation reaction, and the gas generation has a bad influence on a battery, like deterioration of life performance at a high temperature and battery life shortening.

Meanwhile, a technique in which gas is intentionally generated by charging a battery at a voltage of 4.4 V to 5.0 V in a post-treatment process and then removed, for increasing a capacity and solving the gas generation problem due to phase transition in a manganese-based positive electrode active material, has been suggested, for example, in U.S. Pat. No. 9,324,994.

However, in the nickel-rich lithium-transition metal compound having a nickel content of 80% or more in transition metals, thermal runaway occurs at a relatively low voltage, and it is difficult to apply a high voltage in a post-treatment process to completely remove a gas phase due to phase transition. Furthermore, the nickel-rich lithium-transition metal compound having a nickel content of 80% or more in transition metals undergoes a severe decrease in a discharge capacity by a high-voltage application process for removing a gas phase due to phase transition, thereby damaging the intrinsic merits of the high-capacity active material.

RELATED ART DOCUMENTS

Patent Documents

U.S. Pat. No. 9,324,994

SUMMARY

An embodiment of the present invention is directed to providing a post-treatment method which may improve life at a high temperature and suppress a decrease in a battery capacity, in a secondary battery including a nickel-rich (Ni-rich) lithium-transition metal composite oxide having a layered structure containing 0.8 moles or more of Ni based on a total of 1 mole of transition metals as a positive electrode active material.

In one general aspect, a post-treatment method of a lithium secondary battery includes an activation step of charging a heated lithium secondary battery to an activation voltage and maintaining the battery at the voltage, in a state in which the lithium secondary battery including a positive electrode including a nickel-rich (Ni-rich) lithium-transition metal composite oxide having a layered structure containing 0.8 moles or more of Ni based on a total of 1 mole of transition metals as a positive electrode active material; a negative electrode; a separator interposed between the positive electrode and the negative electrode; and an electrolyte solution, which are built in a battery case, is heated, the activation voltage being equal to or higher than a voltage generating phase transition of the lithium-transition metal composite oxide.

In the post-treatment method of a lithium secondary battery according to an exemplary embodiment of the present invention, the activation voltage may be 4.15 V to 4.30 V.

In the post-treatment method of a lithium secondary battery according to an exemplary embodiment of the present invention, the charging of the lithium secondary battery to the activation voltage may be performed at a C-rate of 0.2 C or less.

In the post-treatment method of a lithium secondary battery according to an exemplary embodiment of the present invention, the activation step may be performed for 0.5 days to 1 day.

In the post-treatment method of a lithium secondary battery according to an exemplary embodiment of the present invention, the heated temperature may be 45° C. to 60° C.

In the post-treatment method of a lithium secondary battery according to an exemplary embodiment of the present invention, the lithium-transition metal composite oxide may satisfy the following Chemical Formula 1:

$$Li_{1+\alpha}(Ni_xM_{(1-x)})O_2 \qquad \text{(Chemical Formula 1)}$$

wherein M includes one or more selected from the group consisting of Mn, Co, Fe, Cr, V, Cu, Zn, and Ti, $\alpha$ is a real number of $0 \leq \alpha \leq 0.50$, and x is a real number of $0.80 \leq x \leq 0.95$.

In the post-treatment method of a lithium secondary battery according to an exemplary embodiment of the present invention, in the activation step, a first activation voltage and a second activation voltage which are different from each other may be alternately applied.

In the post-treatment method of a lithium secondary battery according to an exemplary embodiment of the present invention, a de-gassing step of removing gas generated in the activation step, after the activation step, may be further included.

In another general aspect, a lithium secondary battery treated by the post-treatment method described above is included.

Other features and aspects will be apparent from the following detailed description, the drawings, and the claims.

DETAILED DESCRIPTION OF EMBODIMENTS

Hereinafter, the post-treatment method of a lithium secondary battery according to the present invention will be described in detail. Here, technical terms and scientific terms used in the present specification have the general meaning understood by those skilled in the art to which the present invention pertains unless otherwise defined, and a description for the known function and configuration which may unnecessarily obscure the gist of the present invention will be omitted in the following description.

In the present invention, the lithium secondary battery subjected to a post-treatment method is a lithium secondary battery including a nickel-rich (Ni-rich) lithium-transition metal composite oxide having a layered structure containing 0.8 moles or more of Ni based on a total of 1 mole of transition metals (including Ni) as a positive electrode active material.

As a specific example, the nickel-rich lithium-transition metal composite oxide may satisfy the following Chemical Formula 1:

$$Li_{1+\alpha}(Ni_xM_{(1-x)})O_2 \quad \text{(Chemical Formula 1)}$$

wherein M includes one or more selected from the transition metal group consisting of Mn, Co, Fe, Cr, V, Cu, Zn, and Ti, α is a real number of 0≤α≤0.50, specifically 0≤α≤0.30, and x is a real number of 0.80≤x≤0.95, specifically 0.80≤x≤0.90.

As a specific example, the nickel-rich lithium-transition metal composite oxide may satisfy the following Chemical Formula 2:

$$Li_{1+\alpha}(Ni_xMa_yMb_z)O_2 \quad \text{(Chemical Formula 2)}$$

wherein Ma is Mn, Mb is Co, α is a real number of 0≤α≤0.50, specifically 0≤α≤0.30, x is a real number of 0.80≤x≤0.95, specifically 0.80≤x≤0.90, y is a real number of 0.05≤y≤0.20, specifically 0.05≤y≤0.15, z is a real number of 0.05≤z≤0.20, specifically 0.05≤z≤0.15, and x+y+z=1.

As described above, the nickel-rich lithium-transition metal composite oxide refers to a lithium-transition metal composite oxide having a layered structure containing 0.8 moles or more of Ni based on a total of 1 mole of transition metals, and as a specific example, may be a material satisfying Chemical Formula 1 or 2.

The present applicant confirmed from a preceding experiment that a nickel-rich lithium-transition metal composite oxide having a nickel content of 80% or more in transition metals undergoes a change from a layered structure to a cubic structure at a voltage of 4.15 V or higher which is a lower voltage than SOC 100%, to promote an oxidation reaction, thereby generating a large amount of oxidizing gas.

As a result of performing various experiments for removing the oxidizing gas in advance before actual use of the battery, it was confirmed that when the battery is charged at about 4.15 V at which phase transition occurs, to generate oxidizing gas, a treatment time was so long that it was impossible to apply the treatment to a real process, and it was difficult to completely remove the oxidizing gas.

In addition, it was confirmed that the nickel-rich lithium-transition metal composite oxide having a nickel content of 80% or more in transition metals had a limitation in phase transition rate improvement (rapid and complete generation of oxidation gas), since thermal runaway occurs even at a level of 4.4 V, to raise an activation voltage, and furthermore, when phase transition is artificially caused by maintaining a highest possible voltage state so that the thermal runaway does not occur for improving the phase transition rate, deterioration of a discharge capacity of a battery greatly occurs.

In order to solve the problems, various experiments were continuously performed, and as a result, it was discovered that when structural phase transition is caused by a voltage in a heated state, a nickel-rich lithium-transition metal composite oxide having a nickel content of 80% or more in transition metals undergoes very active and rapid phase transition even at a low voltage, and based on this discovery, an intensified follow-up experiment was performed, thereby consequently developing a post-treatment process which may also prevent deterioration of a discharge capacity of a battery, and completing the present invention.

In the post-treatment method according to the present invention based on the above discovery, a lithium secondary battery including a positive electrode including a nickel-rich (Ni-rich) lithium-transition metal composite oxide having a layered structure containing 0.8 moles or more of Ni based on a total of 1 mole of transition metals as a positive electrode active material; a negative electrode; a separator interposed between the positive electrode and the negative electrode; and electrolyte solution which are built in a battery case, is post-treated.

The post-treatment method according to the present invention includes: charging a heated lithium secondary battery to an activation voltage and maintaining the battery at the voltage, in the state in which the lithium secondary battery to be post-treated is heated (activation step), the activation voltage being equal to or higher than a voltage generating phase transition of the lithium-transition metal composite oxide (hereinafter, referred to as a critical voltage).

The post treatment method according to the present invention has a merit that in the state in which a lithium secondary battery to be post-treated is heated, the lithium secondary battery is charged to a voltage equal to or higher than a critical voltage, thereby rapidly promoting the structural phase transition of the nickel-rich lithium-transition metal composite oxide even when the activation voltage is in a low voltage level similarly to the critical voltage, so that oxidizing gas causing phase transition may be removed within a time applicable to a process.

In a specific example, in the activation step, a heated temperature of the lithium secondary battery may be 45° C. to 60° C. When the lithium secondary battery heated to 45° C. to 60° C., specifically 45° C. to 55° C., and more specifically 45° C. to 50° C. is charged to and maintained at the activation voltage, the oxidizing gas which may be caused by structural phase transition of a positive electrode active material may be effectively removed, only by performing the activation step only for about 1 day. Above 60° C., when the lithium secondary battery is heated to a high temperature, and charged to and maintained at the activation voltage, a time required for activation may be shortened, but there is a risk of significant capacity loss in the activation step, and thus, it is advantageous that the activation voltage is applied to the lithium secondary battery in the state in which the lithium secondary battery is heated to a temperature of 60° C. or lower, preferably 55° C. or lower, and more preferably 50° C. or lower.

However, when a low activation voltage near the same critical voltage is applied to an unheated lithium secondary battery, it takes three days or more to remove the same amount of the oxidizing gas, and thus, it is difficult to apply the treatment to a real battery production process.

In a specific example, when the lithium secondary battery heated to 45° C. to 60° C., specifically 45° C. to 55° C., and more specifically 45° C. to 50° C. is charged to and maintained at the activation voltage, the oxidizing gas which may be caused by the structural phase transition may be effectively removed, even by applying a low activation voltage near a critical voltage at which thermal runaway may be stably prevented.

As an example, the activation voltage applied to the heated lithium secondary battery may be in a very low level which is within the critical voltage+0.15 V. As a substantial example, the activation voltage may be 4.15 V to 4.30 V, advantageously 4.15 V to 4.25 V, and more advantageously 4.20 V to 4.25 V.

In the lithium secondary battery including the nickel-rich lithium-transition metal composite oxide having a nickel content of 80% or more in transition metals as a positive electrode active material, the structural phase transition of the positive electrode active material may be greatly promoted by heating, but battery capacity deterioration may occur very sensitively depending on the size of a voltage (activation voltage) applied in the state in which the lithium secondary battery is heated.

Substantially, before performing the activation step, when the heated lithium secondary battery is charged to and maintained at the activation voltage of 4.30 V, based on a reversible discharge capacity of the lithium secondary battery, the reversible discharge capacity of 95% or more may be maintained. In addition, when the heated lithium secondary battery is charged to and maintained at the activation voltage of 4.25 V, the reversible discharge capacity of 99% or more may be maintained. In addition, when the heated lithium secondary battery is charged to and maintained at the activation voltage of 4.20 V, the reversible discharge capacity of 100% is maintained, whereby deterioration of the discharge capacity may be substantially completely prevented.

Thus, it is preferred that the activation step is performed by charging the lithium secondary battery heated to 45° C. to 50° C. to the activation voltage of 4.20 V to 4.25 V and maintaining the voltage so that an activation treatment time of about 1 day (time during which the lithium secondary battery remains charged to the activation voltage) and the reversible discharge capacity retention rate of 99% or more are secured.

The post-treatment method of the lithium secondary battery according to a specific example may include: a) heating a lithium secondary battery to be activated to a constant temperature and maintaining the temperature; b) charging the heated lithium secondary battery to an activation voltage; and c) maintaining the charge state of the lithium secondary battery heated and charged to the activation voltage for a period of time. In addition, after step c), a step of discharging the lithium secondary battery may be further performed, of course.

As described above, the temperature to which the lithium secondary battery is heated may be 45° C. to 60° C., specifically 45° C. to 55° C., and more specifically 45° C. to 50° C., the activation voltage may be 4.15 V to 4.30 V, advantageously 4.15 V to 4.25 V, and more advantageously 4.20 V to 4.25 V, and the charge state maintenance time may be about 1 day, specifically 0.8 to 1.5 days, and more specifically 0.8 to 1.2 days.

In a specific example, when a lithium secondary battery including the nickel-rich lithium-transition metal composite oxide having a nickel content of 80% or more in transition metals as a positive electrode active material, is charged to the activation voltage exceeding SOC 100%, in the state of being heated, a charging current rate of the lithium secondary battery, that is, C-rate at which charging is performed may have a large influence on discharge capacity deterioration.

Specifically, even in the case in which the activation step is performed at 4.20 V to 4.25 V which is a safe activation voltage range, when the battery is not charged to the activation voltage at a proper C-rate, a discharge capacity may be decreased.

As an advantageous example, the heated lithium secondary battery may be charged to the activation voltage at a C-rate of 0.2 C or less, and substantially charged at a C-rate of 0.1 C to 0.2 C. As a specific example, step b) of charging the heated lithium secondary battery to the activation voltage may be performed under a constant current (CC) condition at a C-rate of 0.1 C to 0.2 C.

In a specific example, a first activation voltage charge state and a second activation voltage charge state which are different from each other in the activation step may be alternated, whereby an activation process time may be further shortened without a decrease in a substantial discharge capacity.

Specifically, of a first activation voltage and a second activation voltage, a relatively high voltage is set as the second activation voltage, and the activation step has a first process of charging the battery to the first activation voltage and maintaining the battery at the voltage; and a second process of charging the battery from the first activation voltage to the second activation voltage, maintaining the battery at the voltage, and discharging the battery to the first activation voltage as unit processes, and the unit processes may be repeatedly performed.

Specifically, the first activation voltage and the second activation voltage are equal to or higher than a critical voltage, and the first activation voltage may be a voltage at which the deterioration of the reversible discharge capacity substantially hardly occurs, specifically 4.15 to 4.25 V, and the second activation voltage may be a voltage at which the structural phase transition of the positive electrode active material is promoted, specifically 4.26 to 4.30 V.

When the structural phase transition of the positive electrode active material is triggered by the second activation voltage in the second process, the phase transition triggered by the second process is maintained and propagated even in the case in which a charge state is lowered by the first activation voltage in the first process, and thus, an effect similar to the case of performing the activation process at a constant voltage of the second activation voltage may be substantially exhibited.

In terms of stably promoting the phase transition by the second activation voltage and stably preventing a capacity decrease by the second activation voltage which is relatively high, a time to maintain the second activation voltage may be 0.5 minutes to 60 minutes, specifically 0.5 minutes to 30 minutes, more specifically 0.5 minutes to 20 minutes, and still more specifically 0.5 minutes to 5 minutes. In addition, in the first process of generating a larger amount of oxidizing gas by the phase transition triggered in the second process, a time to maintain the first activation voltage may be 30 minutes to 2 hours, and specifically 30 minutes to 1 hour, but is not necessarily limited thereto.

A time to repeatedly perform the unit processes of the first process and the second process (a total time to perform the activation step) may be 0.3 days to 1 day, specifically 0.3 days to 0.9 days, and more specifically 0.3 days to 0.8 days, but is not necessarily limited thereto.

In a specific example, after the activation step described above is performed, a de-gassing step of opening the case of the secondary battery to remove gas (oxidizing gas) generated in the activation step may be further performed, and after the de-gassing step, a step of sealing the opened secondary battery case may be further performed.

In a specific example, before the activation step described above is performed, a pre-charging step in which the lithium secondary battery is charged to a level of SOC 10 to 30% may be further performed, and after the pre-charging step is performed, a step of opening the secondary battery case to remove gas generated in the pre-charging step and sealing the secondary battery case, may be further performed. In the pre-charging step, gas may occur by production of a passive film on a surface of the negative electrode and/or decomposition of moisture in the battery, or the like, and after gas generated in the pre-charging step is removed, the activation step described above may be performed. When the pre-charging step is performed, it is advantageous that charging is performed at a C-rate of 0.2 C or less from the voltage at which the pre-charging is performed to the activation voltage, and the discharge rate (C-rate) of the secondary battery subjected to the activation step may be any rate which is commonly used in a general formation process in a lithium secondary battery field.

In a specific example, the lithium secondary battery to be post-treated may include an electrode structure including a positive electrode, a negative electrode, and a separator interposed between the positive electrode and the negative electrode; and an electrolyte solution, which are built in a battery case and sealed.

The positive electrode may be a positive electrode in which a positive electrode active material layer including a positive electrode active material which is the nickel-rich lithium-transition metal composite oxide described above is formed at least one surface of a positive electrode current collector.

The negative electrode may be a negative electrode in which a negative electrode active material layer including a negative electrode active material is formed at least one surface of a negative electrode current collector. The negative electrode active material may be any material which is commonly used in the negative electrode of the lithium secondary battery. As a non-limiting example, the negative electrode active material may be one or two or more materials selected from the group of negative electrode active materials of lithium (metal lithium), easily graphitized carbon, hardly graphitized carbon, graphite, silicon, an Sn alloy, an Si alloy, an Sn oxide, an Si oxide, a Ti oxide, an Ni oxide, a Fe oxide (FeO), a lithium-titanium oxide (Li-TiO$_2$, Li$_4$Ti$_5$O$_{12}$), and the like, but is not limited thereto.

A binder of the positive electrode active material layer or the negative electrode active material layer may be a material commonly used in the electrode of the lithium secondary battery, and may be any polymer which does not chemically react with an electrolyte solution and may bind active materials, or an active material and a current collector. As a specific example, the positive electrode active material layer and negative electrode active material layer binders may be independently of each other, polyvinylidene fluoride, a polyvinylidene fluoride-hexafluoropropylene copolymer, a polyvinylidene fluoride-trichloroethylene copolymer, polymethyl methacrylate, polyacrylonitrile, polyvinylpyrrolidone, polyvinyl acetate, a polyethylene-vinyl acetate copolymer, polyethylene oxide, cellulose acetate, cellulose acetate butyrate, cellulose acetate propionate, cyanoethylpulluran, cyanoethylpolyvinylalcohol, cyanoethylcellulose, cyanoethylsucrose, pullulan, carboxymethylcellulose, a styrene-butadiene copolymer, an acrylonitrile-styrene-butadiene copolymer, polyimide, polytetrafluoroethylene, or a mixture thereof, but the present invention is not limited to the materials of the binder, of course.

The negative electrode active material layer and the positive electrode active material layer may independently of each other include a conductive material, a binder, or a conductive material and a binder. The conductive material may be any conductive material which is commonly used in the lithium secondary battery, for improving the electrical conductivity of an active material itself. Specific examples of the conductive material may include conductive carbon bodies such as carbon black, acetylene black, ketjen black, channel black, furnace black, lamp black, thermal black, or a mixture thereof; conductive fibers such as carbon fiber or metal fiber; conductive nanostructures such as carbon nanotube or graphene; and the like, but are not limited thereto. The binder may be any material which is commonly used in the electrode of the lithium secondary battery for improving a binding force of the positive electrode active material layer or the negative electrode active material layer. As a specific example, the positive electrode active material layer and negative electrode active material layer binders may be independently of each other, polyvinylidene fluoride, a polyvinylidene fluoride-hexafluoropropylene copolymer, a polyvinylidene fluoride-trichloroethylene copolymer, polymethyl methacrylate, polyacrylonitrile, polyvinylpyrrolidone, polyvinyl acetate, a polyethylene-vinyl acetate copolymer, polyethylene oxide, cellulose acetate, cellulose acetate butyrate, cellulose acetate propionate, cyanoethylpulluran, cyanoethylpolyvinylalcohol, cyanoethylcellulose, cyanoethylsucrose, pullulan, carboxymethylcellulose, a styrene-butadiene copolymer, an acrylonitrile-styrene-butadiene copolymer, polyimide, polytetrafluoroethylene, or a mixture thereof, but the present invention is not limited to the materials of the binder, of course.

A positive electrode current collector or a negative electrode current collector may be any positive electrode current collector or negative electrode current collector which is used in a common lithium secondary battery. Specifically, the negative electrode or positive electrode current collector may be any material which has excellent conductivity and is a chemically stable material during charge and discharge of a battery, and specifically, the current collector may be a conductive material such as graphite, graphene, titanium, copper, platinum, aluminum, nickel, silver, gold, or carbon nanotubes, but is not limited thereto. The current collector may be in the form of foam, film, mesh, felt, or perforated film of the conductive material, but the present invention is not limited to the shapes and materials of the current collector, or course.

The separator may be any micro porous film which is permeable to ions involved in charging and discharging such as a lithium ion and electrically insulates the positive electrode and the negative electrode in a common secondary battery. As a specific example, the separator may be a porous polymer film, for example, a porous polymer film prepared with a polyolefin-based polymer such as an ethylene homopolymer, a propylene homopolymer, an ethylene/butene copolymer, an ethylene/hexene copolymer, and an ethylene/methacrylate copolymer, alone or a laminate thereof, or a common porous nonwoven fabric, for example, a nonwoven fabric of glass fiber having a high melting point, a polyethylene terephthalate fiber, and the like, but is not limited thereto.

The electrolyte of the electrolyte solution may be any common non-aqueous electrolyte which smoothly conducts ions involved in charge and discharge of a battery, in the common lithium secondary battery. As an example, the non-aqueous electrolyte may include a non-aqueous solvent and a lithium salt. As a non-limiting example, the lithium salt contained in the electrolyte may be a salt providing lithium cations and one or more anions selected from the group consisting of $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(F_5O_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

A solvent in the electrolyte solution may be any common non-aqueous organic solvent used for dissolving an electrolyte in a common lithium secondary battery. As a specific example, the solvent of the electrolyte solution may be one or more selected from the group consisting of ethylene carbonate, propylene carbonate, 1,2-butylene carbonate, 2,3-butylene carbonate, 1,2-pentylene carbonate, 2,3-pentylene carbonate, vinylene carbonate, dimethyl carbonate, diethyl carbonate, di(2,2,2-trifluoroethyl) carbonate, dipropyl carbonate, dibutyl carbonate, ethylmethyl carbonate, 2,2,2-trifluoroethyl methyl carbonate, methylpropyl carbonate, ethylpropylcarbonate, 2,2,2-trifluoroethyl propyl carbonate, methyl formate, ethyl formate, propyl formate, butyl formate, dimethyl ether, diethyl ether, dipropyl ether, methylethyl ether, methylpropyl ether, ethylpropyl ether, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, γ-thiobutyrolactone, γ-ethyl-γ-butyrolactone, β-methyl-γ-butyrolactone, γ-valerolactone, σ-valerolactone, γ-caprolactone, ε-caprolactone, β-propiolactone, tetrahydrofuran, 2-methyl tetrahydrofuran, 3-methyltetrahydrofuran, trimethyl phosphate, triethyl phosphate, tris(2-chloroethyl) phosphate, tris (2,2,2-trifluoroethyl) phosphate, tripropyl phosphate, triisopropyl phosphate, tributyl phosphate, trihexyl phosphate, triphenyl phosphate, tritolyl phosphate, methyl ethylene phosphate, ethyl ethylene phosphate, dimethyl sulfone, ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl)sulfone, di(pentafluoroethyl) sulfone, trifluoromethyl pentafluoroethyl sulfone, trifluoromethyl nonafluorobutyl sulfone, pentafluoroethyl nonafluorobutyl sulfone, sulfolane, 3-methylsulfolane, 2-methylsulfolane, 3-ethylsulfolane, 2-ethylsulfolane, and the like, but the present invention may not be limited to the lithium salts and the solvents described above, of course.

The present invention includes a lithium secondary battery treated by the post-treatment method described above. The present invention includes a battery module, in which unit cells are connected in series or in parallel, using the lithium secondary battery treated by the post-treatment method described above as the unit battery cell.

The present invention includes a device in which electric power is supplied by the lithium secondary battery treated by the post-treatment method described above. As a specific example, the device may be an electric automobile, a hybrid electric automobile, a plug-in hybrid electric automobile, a system for power storage, and the like, but is not limited thereto.

Example 1

A pouch-type lithium secondary battery full cell was manufactured, using artificial graphite as a negative electrode active material, $LiNi_{0.8}Mn_{0.1}Co_{0.1}O_2$ as a positive electrode active material, a polyethylene-based microporous film, and an electrolyte solution which is a mixed solution of ethylene carbonate (EC)/ethyl methyl carbonate (EMC) of 1 (vol)/3 (vol) of 1 M $LiPF_6$.

The manufactured pouch-type lithium secondary battery full cell was charged under a condition of 1.00 V and a constant current (CC) of 0.5 C, and the pouch was opened to remove gas and sealed again to complete pre-charging.

The pre-charged pouch-type lithium secondary battery full cell was heated to 45° C., charged under a condition of 4.23 V (SOC 102.5%) and a constant current (CC) of 0.2 C while the heated state was maintained, and maintained in the charged state for 1 day, the pouch was opened to remove gas and sealed again, and the battery was full-discharged under a condition of CC of 0.5 C to manufacture an activation-treated lithium secondary battery.

Example 2

An activation-treated lithium secondary battery was manufactured in the same manner as in Example 1, except that the pre-charged pouch-type lithium secondary battery full cell was charged to 4.25 V (SOC 105%) instead of 4.23 V (SOC 102.5%).

Example 3

An activation-treated lithium secondary battery was manufactured in the same manner as in Example 1, except that the pre-charged pouch-type lithium secondary battery full cell was charged to 4.28V (SOC 107.5%) instead of 4.23 V (SOC 102.5%).

Example 4

An activation-treated lithium secondary battery was manufactured in the same manner as in Example 1, except that the pre-charged pouch-type lithium secondary battery full cell was charged to 4.31V (SOC 110%) instead of 4.23 V (SOC 102.5%).

Example 5

An activation-treated lithium secondary battery was manufactured in the same manner as in Example 1, except that the pre-charged pouch-type lithium secondary battery full cell was charged to 4.25 V under a CC condition of 0.5 C instead of 0.2 C.

Example 6

The pouch-type lithium secondary battery full cell which was pre-charged in the same manner as in Example 1 was heated to 45° C., charged under a condition of 4.23 V (SOC 102.5%) and a constant current (CC) of 0.2 C while the heated state was maintained, maintained in the charged state for 1 hour, charged under a condition of 4.28 V (SOC 107.5%) and a constant current (CC) of 0.2 C, maintained in the charged state for 1 minute, and discharged under a condition of 4.23 V (SOC 102.5%) and a constant current (CC) of 0.2 C, this process was repeatedly performed 6 times, the pouch was opened to remove gas and sealed again, and the battery was full-discharged under a condition of CC of 0.5 C to manufacture an activation-treated lithium secondary battery.

Table 1 summarizes reversible discharge capacities of lithium secondary batteries which were activation-treated in Examples 1 to 6, when the reversible discharge capacity of the lithium secondary battery before activation treatment was 100%.

TABLE 1

|  | Example 1 | Example 2 | Example 3 | Example 4 | Example 5 | Example 6 |
|---|---|---|---|---|---|---|
| Reversible discharge capacity (%) | 99.8% | 99.5% | 97.4% | 95.1% | 98.4% | 99.4% |

Time points (based on days) at which a volume expansion of the pouch reached 110%, when the lithium secondary batteries which were activation-treated in Examples 1 to 6 were repeatedly charged and discharged with SOC 100% charge cut-off and SOC 10% discharge cut off under a condition of CC of 0.1 C, were measured, and are showed in Table 2.

TABLE 2

|  | Example 1 | Example 2 | Example 3 | Example 4 | Example 5 | Example 6 |
|---|---|---|---|---|---|---|
| Charge/discharge cycle date (day) | 180 days | 220 days | 250 days | 280 days | 255 days | 240 days |

The post-treatment method according to the present invention may improve a lithium secondary battery life by previously removing oxidizing gas derived from phase transition before actual use of the lithium secondary battery including a nickel-rich lithium-transition metal composite oxide as a positive electrode active material.

In addition, the post-treatment method according to the present invention may effectively prevent deterioration of a discharge capacity and substantially completely remove oxidizing gas derived from phase transition of the nickel-rich lithium-transition metal composite oxide within a time applicable to a production process for about 1 day.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A degassing method for a lithium secondary battery, the degassing method comprising:
    an activation step of charging a heated lithium secondary battery to an activation voltage and maintaining the battery at the voltage, in a state in which the lithium secondary battery including a positive electrode including a nickel-rich (Ni-rich) lithium-transition metal composite oxide having a layered structure containing 0.8 moles or more of Ni based on a total of 1 mole of transition metals as a positive electrode active material; a negative electrode; a separator interposed between the positive electrode and the negative electrode; and an electrolyte solution, which are built in a battery case, is heated, the activation voltage being equal to or higher than a voltage generating phase transition of the lithium-transition metal composite oxide, and
    degassing step of removing gas generated in the activation step,
    wherein the activation voltage is 4.15 V to 4.30 V, and
    wherein a first activation voltage charge state and a second activation voltage charge state which are different from each other are alternated in the activation step.

2. The degassing method of a lithium secondary battery of claim 1, wherein the charging of the lithium secondary battery to the activation voltage is performed at a C-rate of 0.2 C or less.

3. The degassing method of a lithium secondary battery of claim 1, wherein a temperature of the heated lithium secondary battery is 45° C. to 60° C.

4. The degassing method of a lithium secondary battery of claim 1, wherein the activation step is performed for 0.5 days to 1 day.

5. The degassing method of a lithium secondary battery of claim 1, wherein the lithium-transition metal composite oxide satisfies the following Chemical Formula 1:

$$Li_{1+\alpha}(Ni_xM_{(1-x)})O_2 \hspace{2em} \text{(Chemical Formula 1)}$$

wherein M includes one or more selected from the group consisting of Mn, Co, Fe, Cr, V, Cu, Zn, and Ti, $\alpha$ is a real number of $0 \leq \alpha \leq 0.50$, and x is a real number of $0.80 \leq x \leq 0.95$.

* * * * *